April 8, 1924.
S. J. FRY ET AL
1,489,997
ELEVATING GRADER
Filed Aug. 16, 1921
3 Sheets-Sheet 3
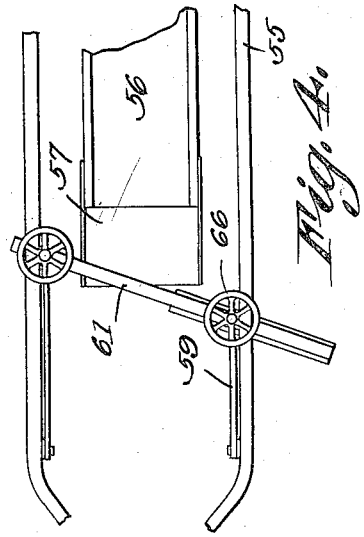
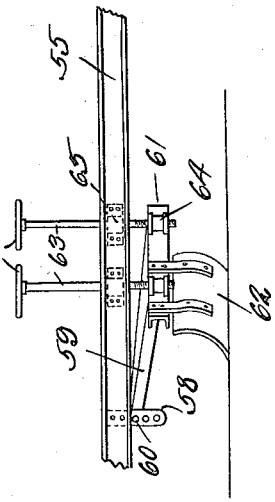
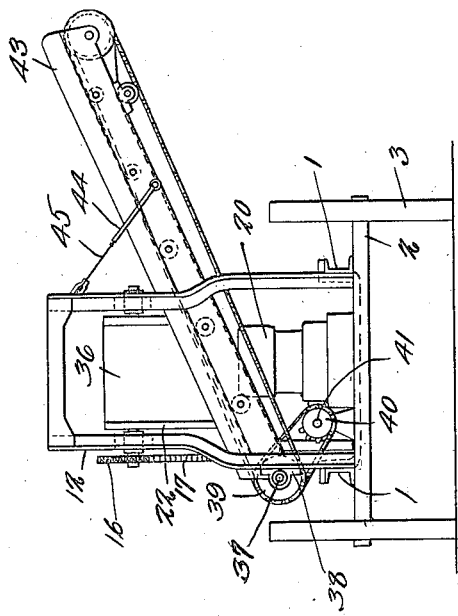
S. J. Fry
H. D. Cline
Inventors
By C. A. Snow & Co.
Attorneys Patented Apr. 8, 1924.

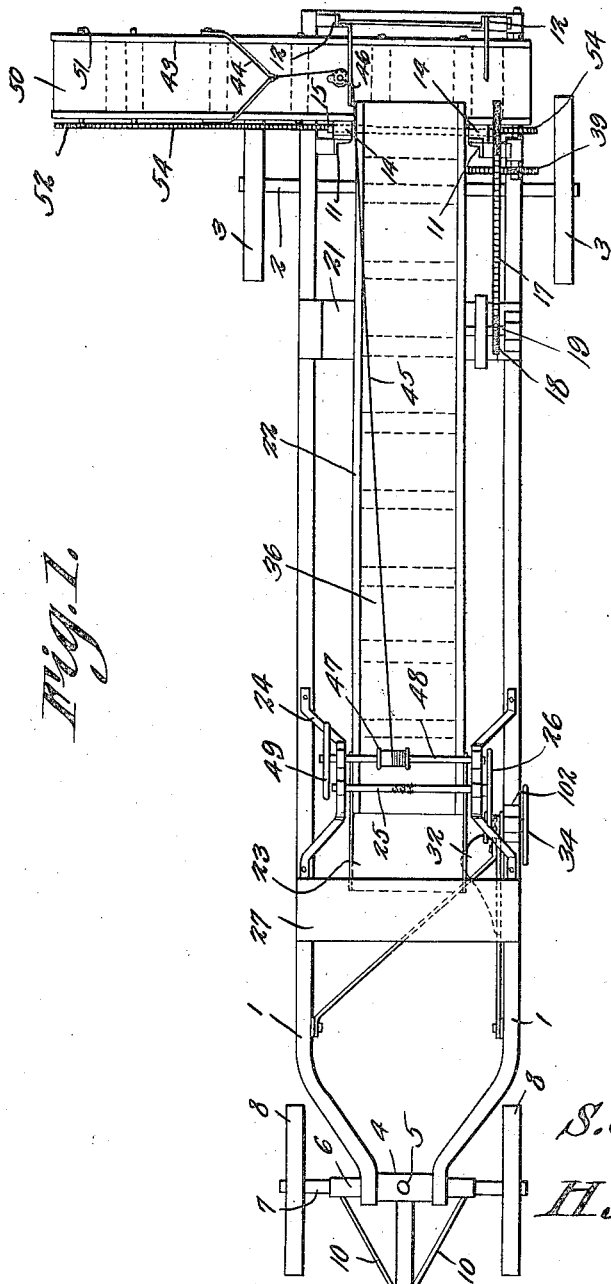

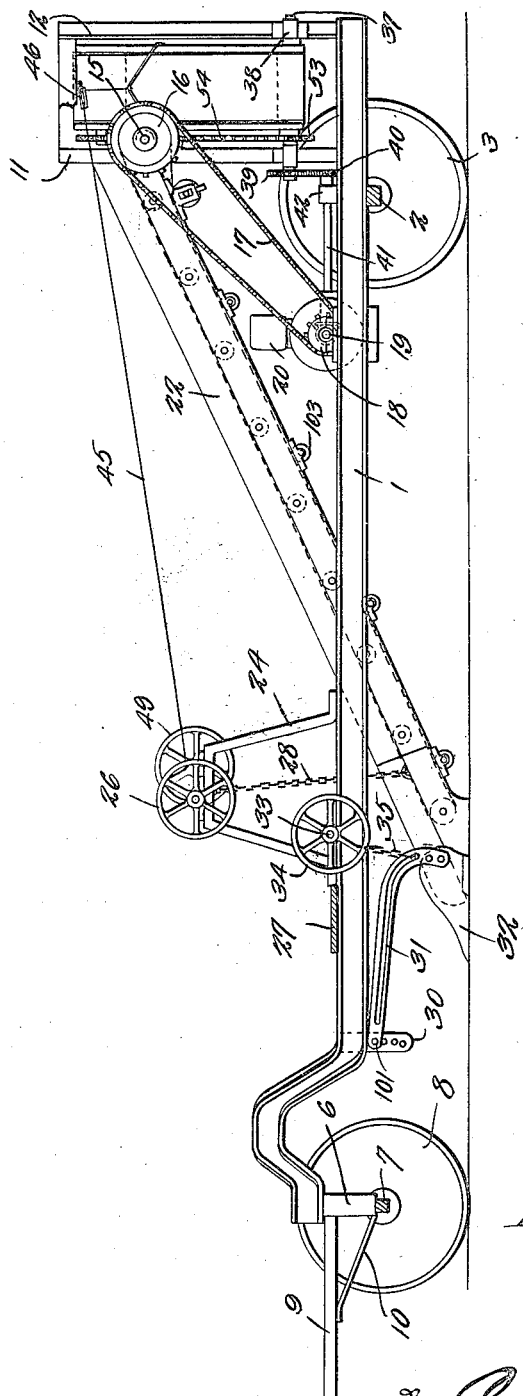

1,489,997

UNITED STATES PATENT OFFICE.

SYLVESTER J. FRY AND HARRY D. CLINE, OF PORTLAND, OREGON.

ELEVATING GRADER.

Application filed August 16, 1921. Serial No. 492,687.

*To all whom it may concern:*

Be it known that we, SYLVESTER J. FRY and HARRY D. CLINE, citizens of the United States, residing at Portland, in the county of Multnomah, State of Oregon, have invented a new and useful Elevating Grader, of which the following is a specification.

It is the object of this invention to provide a simple but efficient mechanism whereby dirt may be scraped up, carried upwardly and rearwardly, and discharged laterally with respect to a vehicle.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in top plan, a device constructed in accordance with the invention; Figure 2 is a side elevation; Figure 3 is a rear elevation; Figure 4 is a fragmental top plan showing a modification; and Figure 5 is a side elevation of the structure delineated in Figure 4.

In carrying out the invention, there is provided a vehicle, including a main frame, comprising side bars 1 carrying a rear axle 2 on which ground wheels 3 are journaled. The forward ends of the side bars 1 are connected by a head piece 4, wherein a king bolt 5 is mounted, a bolster 6 being mounted to swing on the king bolt, the bolster carrying an axle 7 provided with ground wheels 8. A tongue 9 projects forwardly from the bolster 6 and is sustained from the bolster 6 by arms 10.

The rear end of the main frame carries an auxiliary frame, including forward standards 11 and rear standards 12. Bearings 14 are mounted on the standards 11, adjacent to the upper ends thereof. A shaft 15 is journaled for rotation in the bearings 14 and carries a sprocket wheel 16 connected by a sprocket chain 17 to a sprocket wheel 18 on the shaft 19 of an engine 20 carried by a platform 21 extended between the side bars 1 of the main frame. A chute 22 extends longitudinally of the main frame and is located between the side bars 1, the chute 22 being downwardly and forwardly inclined. The rear end of the chute 22 is mounted pivotally on the shaft 15. The forward end of the chute 22 carries a scraper 23. Standards 24 are erected on the side bars 1 of the main frame. A shaft 25 is journaled in the standards 24 and is controlled by a hand wheel 26. The hand wheel 26 is accessible from a platform 27 extended between the side bars 1. A flexible element 28 is wound about the shaft 25, the lower end of the flexible element 28 being connected to the forward end of the first chute 22.

A hanger 30 is attached to one of the side bars 1. The numeral 31 denotes a beam, adjustably pivoted on the hanger 30 as indicated at 101. A plow 32 is carried by the rear end of the beam 31, and the mold board of the plow 32 is so set as to discharge upon the scraper 23, and, consequently, into the chute 22. A shaft 33 is journaled in a bearing 102 mounted on one of the side bars 1, the shaft 33 being under the control of a hand wheel 34. A flexible element 35 is wound about the shaft 33, the lower end of the flexible element being attached to the plow beam 31.

The chute 22 is traversed by an endless belt conveyor 36, driven from the shaft 15 and supported on rollers 103 carried by the chute. A shaft 37 is journaled in bearings 38 mounted on the standards 11 and 12 adjacent to the lower ends thereof. At its inner end, the shaft 37 carries a sprocket wheel 39 driven by means of a sprocket chain, from a sprocket wheel 40 on a shaft 41, driven by the engine 20, the shaft 41 being journaled in bearings 42 on the frame work of the machine. A second chute is disposed at right angles to the first chute 22 and is mounted at its lower end on the shaft 37, to swing vertically, the chute 43 extending laterally and upwardly, as shown to best advantage in Figure 3. A crotch line 44 is connected to the second chute 43, the crotch line 44 being connected to a flexible element 45 rove across a sheave 46 supported on the auxiliary frame. The flexible element 45 is wound around a drum 47 on a shaft 48 under the control of a hand wheel 49, the shaft 48 being journaled on the standards 44.

The second chute 43 is traversed by an endless belt conveyor 50, mounted on the shaft 37 and mounted on a shaft 51 journaled in the upper or outer end of the second chute 43. There is a sprocket wheel 52 on the shaft 51, a sprocket wheel 53 being mounted on the shaft 37. A sprocket chain 54 forms an operative connection between the sprocket wheels 52 and 53.

In practical operation, the plow 32 may be raised and lowered by manipulating the hand wheel 34. Similarly, the forward end of the first chute 22 may be raised and lowered by manipulating the hand wheel 26. The outer end of the second chute 43 may be raised and lowered through the instrumentality of the hand wheel 49. From the engine 20, motion is transmitted to the shaft 15 by the sprocket chain 17. The shaft 12 drives the conveyor 36. From the engine 20, motion is transmitted by the shaft 41 and the chain and sprocket connection 39—40, to the lateral conveyor 50.

Dirt loosened by the plow 32 is cast onto the scraper 23 and into the chute 22. The dirt is picked up and elevated by the conveyor 36 and is deposited by the conveyor 36 on the laterally extended and upwardly inclined conveyor 50, the dirt thus being conveyed to one side of the machine.

In the modification shown in Figure 4 of the drawings, the side bars of the main frame appear at 55, the chute being shown at 56, and the scraper at 57. Hangers 58 depend from the side bars 55. Links 59 are adjustably and pivotally connected with the hangers 58, as shown at 60. The rear ends of the links 59 are connected to a cross bar 61 carrying a scraper 62. Shafts 63 are held for rotation, but against longitudinal movement, as indicated at 65 on the side bars 55. The upper ends of the shafts 63 are provided with hand wheels 66. The lower ends of the shafts 63 are threaded into bearings 64 carried by the bar 61. Obviously, by rotating the shafts 63, the bar 61, and consequently the scraper 62 may be raised and lowered, as occasion may demand, the links 59 swinging upwardly or downwardly on their pivotal mountings 60. The modification shown in Figures 4 and 5 consist, essentially, in replacing the plow 32 of Figure 1 by the scraper 62 of Figure 5.

Although it has been pointed out that the device forming the subject matter of this application is adapted to handle dirt, it will be understood that it will be found useful for removing snow in city streets and for many other purposes which will suggest themselves readily to the user.

Having thus described the invention, what is claimed is:

1. In a device of the class described, a wheel mounted main frame, an upstanding auxiliary frame erected on the rear end of the main frame, a downwardly and forwardly inclined first conveyor extended longitudinally of the main frame and pivoted at its rear end to the auxiliary frame at a point adjacent to the upper end of the auxiliary frame, a lateral conveyor pivoted to one side of the main frame at a point adjacent to the lower end of the auxiliary frame and extended through the auxiliary frame to a point beyond the opposite side of the auxiliary frame, the first conveyor discharging upon the second conveyor intermediate the ends of the second conveyor, a vertically adjustable soil-engaging member carried by the main frame and discharging laterally toward the forward end of the first conveyor, a standard on the main frame and disposed adjacent to the forward end of the first conveyor, shafts journaled on the standard, flexible elements connected to the respective shafts, and connected to the conveyors, means on the auxiliary frame for guiding the intermediate portion of the flexible element which is connected to the second conveyor, and means for raising and lowering the soil-engaging member said means and the shafts being accessible from a single place of manipulation on the main frame.

2. In a device of the class described, a wheel mounted main frame, an upstanding auxiliary frame on the rear end of the main frame, an upper shaft journaled on the upper portion of the auxiliary frame and disposed transversely of the main frame, a first conveyor extended longitudinally of the main frame and driven from the first shaft, means for carrying the first conveyor, said means being mounted pivotally on the upper shaft, a lower shaft journaled on the lower portion of the auxiliary frame and extended longitudinally of the main frame, a second conveyor extended transversely of the main frame and receiving material from the first conveyor, the second conveyor being driven from the upper shaft, means for carrying the second conveyor, said means being pivotally mounted on the lower shaft, an engine on the main frame and located beneath the first conveyor, means for driving the upper shaft directly from the engine, a third shaft extended longitudinally of the main frame and driven by the engine, and a driving connection between the third shaft and the lower shaft, and means for raising and lowering the outer ends of the conveyors.

In testimony that we claim the foregoing as our own, we have hereto affixed our signatures in the presence of two witnesses.

SYLVESTER J. FRY.
HARRY D. CLINE.

Witnesses:
 THOMAS HART,
 A. CLARK.